United States Patent
Thomas et al.

(10) Patent No.: US 8,402,284 B2
(45) Date of Patent: Mar. 19, 2013

(54) SYMBIOTIC STORAGE DEVICES

(75) Inventors: Fred C. Thomas, Fort Collins, CO (US); Anthony J. Hernandez, Westminster, CO (US); John M. Agosta, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1157 days.

(21) Appl. No.: 11/742,564

(22) Filed: Apr. 30, 2007

(65) Prior Publication Data
US 2008/0270797 A1 Oct. 30, 2008

(51) Int. Cl.
*G06F 21/00* (2006.01)

(52) U.S. Cl. ........... 713/193; 726/3; 709/212; 709/216; 709/248; 707/644

(58) Field of Classification Search .................. 709/248, 709/212, 216; 726/2–3; 713/193; 707/644–655
See application file for complete search history.

(56) References Cited

U.S. PATENT DOCUMENTS

| | | | | |
|---|---|---|---|---|
| 5,928,329 A * | 7/1999 | Clark et al. | ................... | 709/227 |
| 6,978,294 B1 | 12/2005 | Adams et al. | | |
| 7,191,299 B1 * | 3/2007 | Kekre et al. | ................... | 711/162 |
| 2002/0004902 A1 * | 1/2002 | Toh et al. | ....................... | 713/170 |
| 2004/0153458 A1 * | 8/2004 | Noble et al. | ................... | 707/10 |
| 2005/0131990 A1 * | 6/2005 | Jewell | .......................... | 709/201 |
| 2005/0228836 A1 * | 10/2005 | Bacastow et al. | ............. | 707/204 |
| 2007/0067349 A1 | 3/2007 | Jhaveri et al. | | |

FOREIGN PATENT DOCUMENTS

| | | |
|---|---|---|
| EP | 1760593 | 3/2007 |
| KR | 10-2006-0059040 | 6/2006 |
| WO | WO-2005/001691 | 1/2005 |
| WO | WO-2006/004851 | 1/2006 |

OTHER PUBLICATIONS

IPO Intellectual Property Office, Office Action mailed Jun. 7, 2011, Application No. GB0919006.7, International Filing Date Apr. 28, 2008, PCT/US2008/061800.

* cited by examiner

*Primary Examiner* — Kambiz Zand
*Assistant Examiner* — John B King

(57) ABSTRACT

A system is provided, the system having a first storage device and a second storage device. A symbiotic relationship is established between the first and second storage devices to selectively store backup digital content for each other.

17 Claims, 4 Drawing Sheets

SYMBIOTIC STORAGE DEVICES

BACKGROUND

Digital storage devices are becoming increasingly prevalent and important. There is an ongoing need to increase digital storage capacity, speed, and security. Recently, home network attached storage (hNAS) devices have been developed to enable home users to store significant amounts of digital content at home. The digital content can be received from networked devices at home or elsewhere. One of the services provided by a hNAS device is to provide a centralized backup copy of digital content for a user. Unfortunately, the hNAS device and its centralized backup copy of digital content are still subject to catastrophic natural disasters or theft.

Various internet-based storage "buckets" are available that enable a user to store digital content and backup copies of digital content to a remote location. However, the slow speed and high cost of these internet-based storage buckets are undesirable. As an example, transferring the contents of a 300 GB hard drive to the internet where the upload speed is 1 Mbps would take approximately one month and would cost several hundred dollars/per month to maintain based on current estimates.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As disclosed herein, embodiments enable two separate storage devices to establish a symbiotic relationship. As used herein, a "symbiotic relationship" refers to two or more devices storing a backup copy of each other's digital content. In at least some embodiments, backup digital content is initially transferred to each storage device in a symbiotic relationship using an accelerated data transfer process. Subsequent transfers of backup digital content between storage devices in a symbiotic relationship occur using a de-accelerated data transfer process. As an example, the accelerated data transfer process may involve connecting the storage devices to each other via a local connection or swapping backup storage units (e.g., disk drives). The de-accelerated data transfer process may involve connecting the storage devices to each other via a network connection. In at least some embodiments, the storage devices correspond to home network attached storage (hNAS) devices. As used herein, a hNAS device refers to a storage device that is physically close to a user (e.g., within the same home or building) or user-controlled devices.

Figure 1:
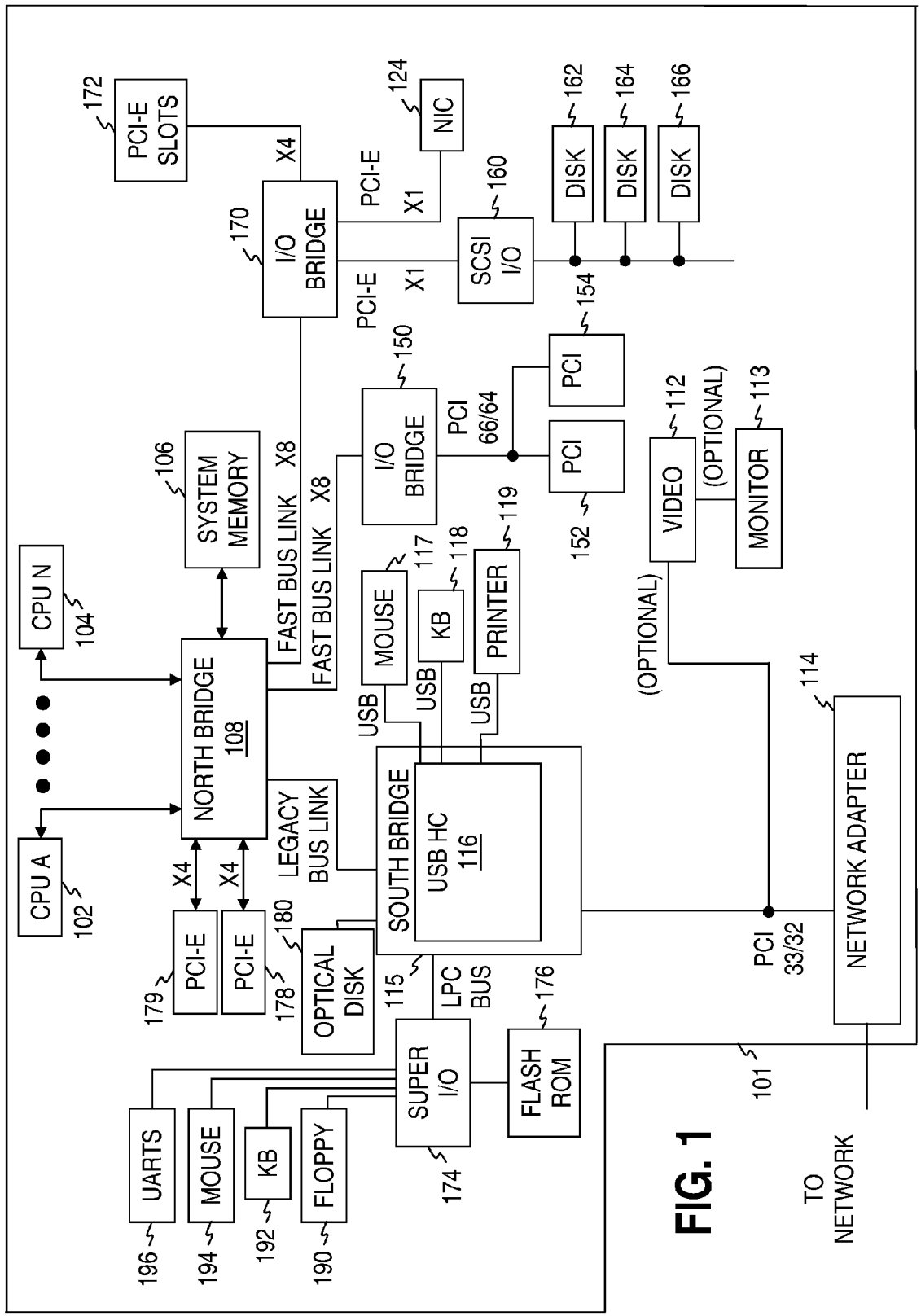
FIG. 1 illustrates a computer in accordance with embodiments.

Referring now to the drawings and in particular to FIG. 1, there is shown a computer 101 in accordance with embodiments of the disclosure. The computer 101 corresponds to a client computer or a server computer. In at least some embodiments, the server computer is a headless server. As used herein, a "headless server" refers to a computing and/or storage devise without a dedicated human interface such as a monitor, a keyboard or a mouse. As shown, the computer 101 comprises a plurality of central processing units (CPUs) 102, 104 coupled to a bus bridge device, commonly referred to in the computer industry as a "North Bridge" 108. The North Bridge 108 couples the CPUs 102, 104 to system memory 106 and to other components of the computer 101. The North Bridge 108 has a significant impact on the computer's performance given that it defines the speed at which data flows between the CPUs 102, 104 and the system memory 106.

As shown, the North Bridge 108 couples to an input/output (I/O) bridge 150 via a "fast" serial bus link (compared to a legacy bus link) having, in some embodiments, eight serial communication channels (×8). This bus may be a proprietary chipset interconnect or may be consistent with an established industry standard such as PCI-Express. In at least some embodiments, the I/O bridge 150 couples to PCI slots 152, 154 via a PCI 66/64 communication interface. The PCI slots 152, 154 may be configured to support insertable/removable PCI cards that enhance the functionality of the computer 101.

The North Bridge 108 also couples to an I/O bridge 170 via another "fast" bus link (compared to a legacy bus link) having, in some embodiments, eight communication channels (×8). As shown, the I/O bridge 170 couples to a Small Computer System Interface (SCSI) module 160 via a PCI Express (PCI-E) communication bus. The SCSI module 160 supports several storage disks 162, 164, 166 based on a SCSI communication protocol. The I/O bridge 170 also couples to a Network Interface Card (NIC) 124 via a PCI-E communication bus. The NIC 124 enables the computer 101 to communicate with other computers or network devices based on a network communication protocol such as Ethernet or Transmission Control Protocol/Internet Protocol (TCP/IP). The I/O bridge 170 also couples to PCI-E slots 172 (e.g., via a communication bus having, in some embodiments, four communication channels (×4)). The PCI-E slots are configured to support insertable/removable PCI-E cards that enhance the functionality of the computer 101. Those skilled in the art will appreciate that the width of the fast bus links as well as PCI-E connections for slots and devices are chosen based on the anticipated bandwidth of the connected devices. Alternatively the supported storage disk drive interface bus may be a SATA (Serial ATA) bus or other common mass storage data bus architecture. Other interconnects as well as other lane widths may be chosen by the system designer.

As shown, the North Bridge 108 also couples to a South Bridge 115 via a legacy communication bus link. This bus link may be a proprietary chipset interconnect or may be consistent with an established industry standard such as PCI-Express. In at least some embodiments, the South Bridge 115 comprises a USB host controller 116 that couples to and supports USB peripheral devices such as a USB mouse 117, a USB keyboard (KB) 118 and a USB printer 119. Those skilled in the art will appreciate that these devices may be coupled through USB connectors and are optional. The South Bridge 115 also couples to and supports an optical disk drive 180 (e.g., a CD-ROM or DVD-ROM drive). The South Bridge 115 also couples to a Super input/output (I/O) interface 174 via a low-pin-count (LPC) bus. The Super I/O (SIO) 174 couples to and supports a Flash ROM 176 as well as a floppy drive 190, a legacy keyboard (KB) 192, a legacy mouse 194 and Universal Asynchronous Receiver/Transmitters (UARTs) 196. Like the USB devices mention above, the SIO 174 provides interfaces to which the enumerated legacy devices may be attached. The presence of a physical legacy keyboard or mouse may not be required for proper operation of the computer 101.

As shown, the South Bridge 115 optionally couples to and supports a video card 112 which optionally couples to a monitor 113. For example, in embodiments where the computer 101 corresponds to a client, the video card 112 and monitor 113 are included. In embodiments where the computer 101 corresponds to a headless server, the video card 112 and monitor 113 are excluded.

The South Bridge 115 also couples to and supports a network adapter 114 via a PCI 33/32 communication bus. Alternatively, the network adapter 114 may be coupled to the host via another suitable communication interface such as PCI-Express, PCI-X, 66/64, LPC, or the like. The network adapter 114 enables the computer 101 to communicate with a printer on a network.

In at least some embodiments, the computer 101 stores digital content in the form of data files, multi-media, applications, or other digital content. The digital content is stored by a computer-readable medium corresponding to the system memory 106, the disks 612, 164, 166, or the optical disk 180 mentioned previously. In general, storage of the digital content may be provided through at least one of secondary storage, read only memory (ROM), random access memory (RAM), or another storage medium now known or later developed. As an example, secondary storage comprises one or more disk drives or tape drives and is used for non-volatile storage of data and as an over-flow data storage device if RAM is not large enough to hold all working data. Secondary storage may be used to store programs that are loaded into RAM when such programs are selected for execution. ROM is used to store instructions and perhaps data that are read during program execution. ROM is a non-volatile memory device that typically has a small memory capacity relative to the larger memory capacity of secondary storage. RAM is used to store volatile data and perhaps to store instructions. Access to both ROM and RAM is typically faster than to secondary storage.

In at least some embodiments, the computer 101 establishes a symbiotic relationship with another device (e.g., another computer 101), in which the computer 101 and the other device selectively and/or automatically exchange a copy of backup digital content. In other words, the computer 101 receives and stores a copy of the device's backup digital content and the device receives and stores a copy of the computer's backup digital content. In alternative embodiments, the computer 101 sends its backup digital content to a repository storage unit that handles storage of backup digital content for multiple computers. In this example, the repository storage unit can then establish a symbiotic relationship with other repository storage unit, in which the repository storage units selectively and/or automatically exchange a copy of backup digital content. In other words, each repository storage unit receives and stores a copy of the other unit's backup digital content.

Embodiments of clients and servers are not limited to the computer 101 of FIG. 1. FIG. 1 simply illustrates one embodiment. Alternative embodiments vary with respect to processing, memory, interconnects, protocols, peripherals and other functional aspects. The computer 101, for example, represents at least one device of a home network having a home server, a hNAS (or other digital storage devices), desktop computers, laptop computers, multi-media devices, mobile devices or other devices. Such devices may be suitably employed to receive, access, or generate digital content that can be stored based on a symbiotic relationship between devices or between repository storage units. As used herein, a "home server" and a "home network" refer to a server and network that are physically close to a user (e.g., within the same home or building) or user-controlled devices. Although some symbiotic relationships are established between devices in close proximity, other symbiotic relationship embodiments involve devices that are remotely located. The devices in a symbiotic relationship (whether computers 101 or repository storage units) are selectively in close proximity or remote from each other. Also, each repository storage unit is selectively in close proximity or remote from the devices that provide the digital content to be stored therein.

Figure 2:
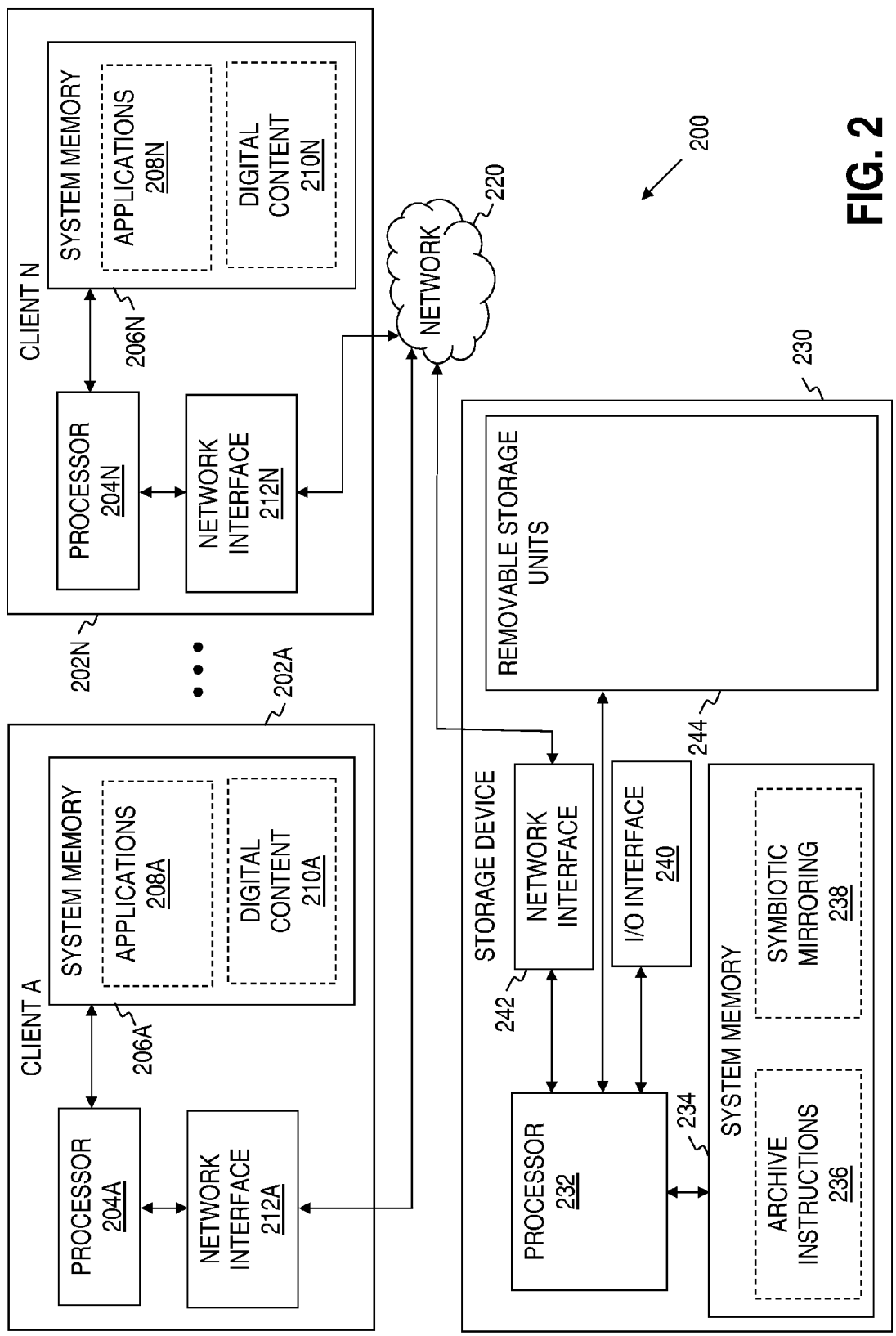
FIG. 2 illustrates a system in accordance with embodiments.

FIG. 2 illustrates a system 200 in accordance with embodiments. As shown, the system 200 comprises a plurality of clients 202A-202N that couple to a storage device 230 via a network 220. The components of the clients 202A-202N, the network 220, and the storage device 230 have been simplified to facilitate describing embodiments. In various embodiments, the clients 202A-202N and the storage device 230 have more or less of the components described for the computer 101 of FIG. 1. As an example, the clients 202A-202N represent desktop computers, laptop computers, multi-media devices, mobile devices or other devices in a home network. In alternative embodiments, the clients 202A-202N represent devices within a remote network. Also, the storage device 230 represent a hNAS device or other storage device.

A representative description of each client will be provided by describing the client 202A. As shown in FIG. 2, the client 202A comprises a processor 202A coupled to a system memory 206A. The processor 202A also couples to a network interface 212A.

In at least some embodiments, the system memory 206A is a computer-readable medium that stores applications 208A, which are executable by the processor 202A. The system memory 206A also stores digital content 210A, which may be in the form of data files, multi-media, applications, or other digital content. The system memory 206A corresponds to at least one of secondary storage, ROM, RAM, or another storage medium now known or later developed. When executed, at least one of the applications 208A enables the client 202A to receive or generate additional digital content 210A. In some embodiments, at least one of the applications 208A enables the client 202A to download digital content from the internet or to generate and store digital content locally. As needed, at least one of the applications 208A is involved with transferring some or all of the digital content 210A to the storage device 230.

As shown in FIG. 2, the storage device 230 comprises a processor 232 coupled to a system memory 234 that stores archive instructions 236 and symbiotic mirroring instructions 238. The system memory 234 corresponds to at least one of secondary storage, ROM, RAM, or another storage medium now known or later developed. The processor 232 also couples to an I/O interface 240. The I/O interface 240 enables the storage device 230 to communicate with a local peripheral device. For example, in some embodiments, the storage device 230 communicates with a similar storage device via the I/O interface 240. In at least some embodiments, the I/O interface comprises an eSATA (External Serial Advanced Technology Attachment) data port or other high-speed data port.

The processor 232 also couples to a network interface 242. The network interface 242 enables the storage device 230 to communicate with devices on the network 220 and corresponds, for example, to an Ethernet with TCP/IP interface protocol. As shown, the storage device 230 communicates to the clients 202A-202N via the network interface 234. The storage device 230 alternative communicates with the clients 202A-202N via another interface.

In some embodiments, the processor 232 also couples to removable storage units 244. The removable storage units 244 correspond to disk drives or other removable storage units. In at least some embodiments, the storage device 230 selectively receives a copy of some or all of the digital content 210A-210N from the clients 202A-202N. The digital content 210A-210N is then stored on at least one of the removable storage units 244 or another storage location.

When executed, the archive instructions 236 are responsible for transferring and organizing some or all of the digital content 210A-210N from the clients 202A-202N. As an example, the archive instructions 236 may cause the storage device 230 to periodically scan the clients 202A-202N for new digital content. Additionally or alternatively, the archive instructions 236 may cause the storage device to recognize prompts from the clients 202A-202N as to when new digital content or a backup of new digital content is ready for storage by the storage device 230. In at least some embodiments, the archive instructions 236 cause the digital content 210A-210N to be stored on at least one of the removable storage units 244. As an example, the storage device 230 may copy data in a redundant manner such that failure of a single storage unit (removable or not) can be automatically recovered via storage redundancy instructions when the failed storage unit is replaced with a functional one. This capability is sometimes referred to as a Redundant Array of Independent Disks (RAID).

When executed, the symbiotic mirroring application 238 is responsible for establishing and maintaining a cooperative relationship between the storage device 230 and another storage device. At least, the symbiotic mirroring application 238 enables the storage device 230 and the other storage device to exchange and store backup digital content for each other. In at least some embodiments, the symbiotic mirroring application 238 protects the digital content being exchanged based on an encryption protocol (e.g., symmetric keys, public-private keys) or other security protocol (e.g., passwords, biometric information or other security token). The encryption protocol or security protocol is implemented as part a user authentication process before the exchange of digital content occurs. Additionally or alternatively, the security protocol or encryption protocol is implemented to protect digital content during or after the exchange occurs.

As an example, in some embodiments, the users of two storage devices bring two storage devices together and use encryption keys or security tokens to establish the symbiotic relationship. The encryptions keys or security tokens are stored on a Universal Serial Bus (USB) flash memory or other location. In other words, the symbiotic mirroring application 238 of one or both storage devices can receive the necessary encryption keys or security tokens to authenticate the establishment of a symbiotic relationship. Once the symbiotic relationship has been established, the participating devices exchange some or all digital content. The exchange process is divided into primary transfers and secondary transfers as will later be described. Once the exchange of digital content has occurred, each storage device selectively enables at least one of the users to access the exchanged digital content. For example, in some embodiments, the symbiotic mirroring application 238 limits access of exchanged digital content so that only the original "owner" receives access. Additionally or alternatively, another user may selectively access the exchanged digital content. In either case, some embodiments implement an authentication process (e.g., encryption keys or security token) to protect the exchanged digital content.

In at least some embodiments, the symbiotic mirroring application 238 also supports ending the symbiotic relationship. In such case, exchanged digital content is deleted from a given storage device or transferred to another storage device. Ending the symbiotic relationship may require the authority of one or both owners of the participating storage devices. In some embodiments, the symbiotic mirroring application 238 supports a plurality of symbiotic relationships. Each symbiotic relationship is between two devices or between more than two devices. As an example if there are three devices "A", "B" and "C", separate symbiotic relationship can be established between A and B, B and C, and A and C. Alternatively, a single symbiotic relationship can be established for A, B and C.

Figure 3:
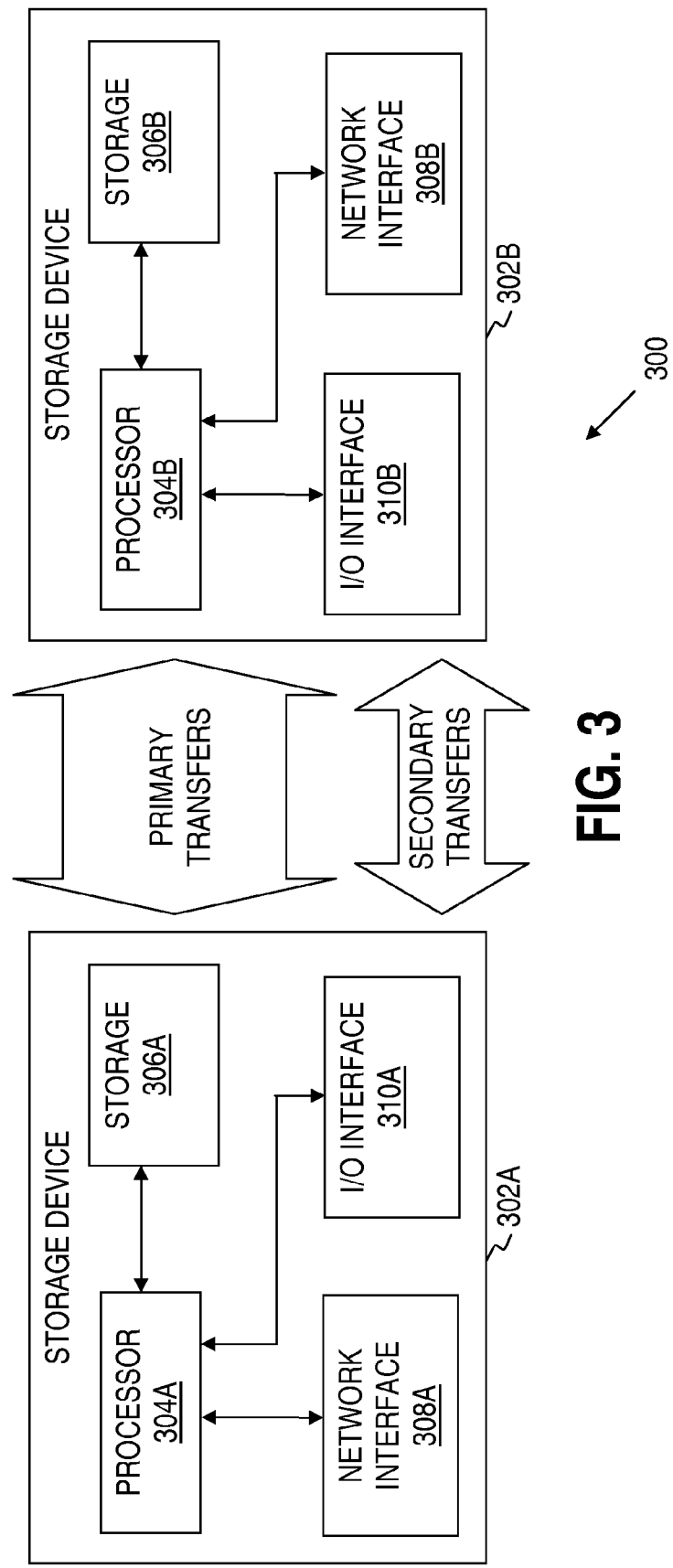
FIG. 3 illustrates a symbiotic relationship between two storage devices in accordance with embodiments.

FIG. 3 illustrates a symbiotic relationship 300 between two storage devices in accordance with embodiments. In FIG. 3, the storage devices 302A, 302B have established a symbiotic relationship. The components of the storage devices 302A, 302B have been simplified to facilitate describing embodiments. In various embodiments, the storage devices 302A, 302B have more or less of the components described for the storage device 230 of FIG. 2 or the computer 101 of FIG. 1. Rather than describe each storage device separately, a representative description of the storage devices 302A, 302B will be provided by describing the storage device 302A.

As shown in FIG. 3, the storage device 302A comprises a processor 304A coupled to storage 306A. The storage 306A contains digital content. The processor also couples to a network interface 308A and an I/O interface 310A, either of which can be used to exchange digital content.

The exchange of digital content between the storage devices 302A, 302B can be categorized into primary transfers and secondary transfers, where primary transfers involve a faster data transfer rate than secondary transfers. In other words, primary transfers are accelerated and secondary transfers are de-accelerated (compared to primary transfers). Primary transfers can be used, for example, when a significant amount of digital content needs to be exchanged. In such case, a faster dater transfer rate is desirable to prevent lag during the exchange process. Secondary transfers can be used, for example, when a non-significant amount of digital content needs to be exchanged, when the exchange occurs remotely, or when the exchange occurs with more than a threshold amount of delay. The symbiotic mirroring application 238 can have predetermined threshold values for determining significant and non-significant amounts of digital content. Also, owners of symbiotic storage devices may select threshold values to indicate significant and non-significant amounts of digital content.

As an example, a primary transfer involves coupling the storage devices 302A, 302B via the I/O interfaces 310A, 310B. The I/O interfaces 310A, 310B correspond to eSATA data ports or other known or later developed I/O ports used for local communications. In the case where the I/O interfaces 310A, 310B correspond to eSATA ports, an approximate data transfer rate of 3 Gbps can be supported. Regardless of the type of I/O interface, there is often a significant speed advantage for local communications compared to remote communications (e.g., communications via a network connection).

Another example of a primary transfer involves exchanging removable storage units (e.g., disk drives with a copy of backup digital content) which correspond to some of the storage 306A, 306B. The exchange of removable storage units occurs locally or remotely (mailing the removable storage units). In either case, the symbiotic mirroring application 238 can facilitate the process of gathering the selected digital content onto at least one of the removable storage units and indicating when a user has correctly removed the selected removable storage unit. When a user receives an exchanged removable storage unit, the symbiotic mirroring application 238 can perform functions such as indicating where to plug in the removable storage unit and indicating whether the exchange of removable storage units has succeeded or failed. Each exchanged removable storage unit is either kept within the symbiotic partner or is copied and then sent back to the original storage device.

As an example, a secondary transfer involves coupling the storage devices 302A, 302B via the network interfaces 308A, 308B. The network interfaces 308A, 308B correspond to Ethernet, TCP/IP interfaces or other known or later developed network interfaces. Regardless of the type of network interface, there is often a significant speed disadvantage for network communications compared to local communications (communications via the I/O interfaces 310A, 310B).

In at least some embodiments, primary transfers are used for initial exchanges of digital content between two symbiotic storage devices or whenever relying on secondary transfers is determined to be undesirable. In some embodiments, the symbiotic mirroring application 236 considers factors such as the location of the symbiotic devices, the amount of digital content to be transferred, or the data transfer rate, and subsequently recommends that a primary transfer or secondary transfer be implemented instead of a default transfer method or user-selected transfer method. As desired, user authentications, encryption keys, and security tokens can be utilized to safeguard the digital content before, during or after any exchanges. Symbiotic relationships (including primary and secondary transfers) can be established between one storage device and a plurality of storage devices or between three or more storage devices.

Figure 4:
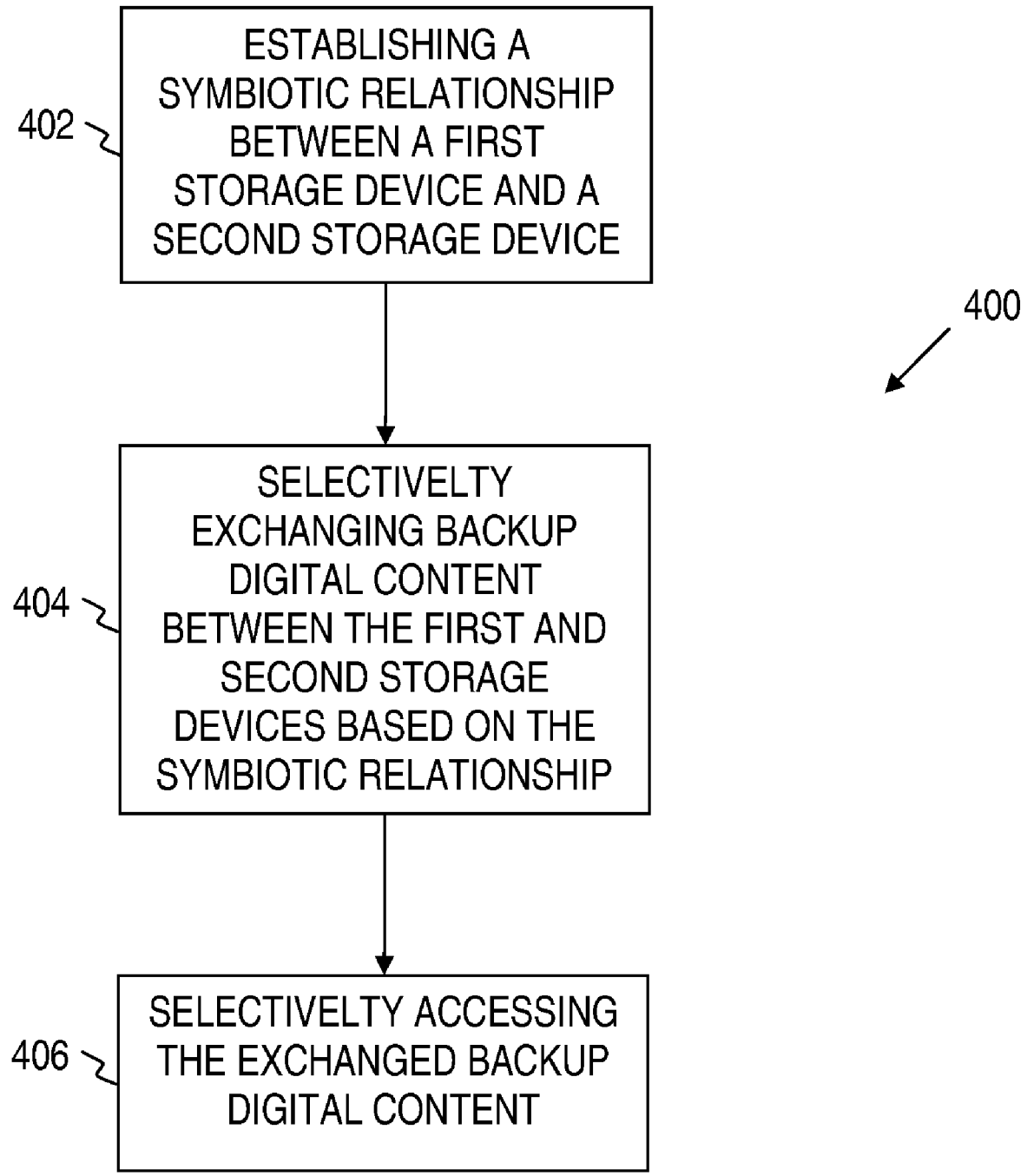
FIG. 4 illustrates a method in accordance with embodiments.

FIG. 4 illustrates a method 400 in accordance with embodiments. The method 400 comprises establishing a symbiotic relationship between a first storage device and a second storage device (block 402). At block 404, backup digital content is selectively exchanged between the first and second storage devices based on the symbiotic relationship. At block 406, the exchanged backup digital content is selectively accessed. The method 400 can also include processes for user authentication, data encryption, primary transfers of digital content, secondary transfers of digital content, termination of a symbiotic relationship, simultaneous supporting a plurality of symbiotic relationships or other processes.

What is claimed is:

1. A system, comprising:
    a first Network Attached Storage (NAS) device;
    a second Network Attached Storage (NAS) device; and
    a communication network, wherein the first and second NAS devices are independently coupled to the communication network and each store backup digital content for at least one other device coupled to the communication network,
    wherein the first and second NAS devices selectively start a symbiotic relationship with each other,
    wherein, during the symbiotic relationship, a first user associated with the first NAS device selects backup digital content to be transmitted from the first NAS device to the second NAS device via the communication network and a second user associated with the second NAS device selects backup digital content to be transmitted from the second NAS device to the first NAS device via the communication network; and
    wherein the first and second NAS devices each have a removable storage unit with the backup digital content and wherein a primary exchange of backup digital content involves exchanging the removable storage units between the first and second NAS devices.

2. The system of claim 1 wherein the primary exchange of backup digital content between the first and second NAS devices involves a faster data transfer rate than secondary exchanges of the backup digital content.

3. The system of claim 1 wherein the first and second NAS devices each have a local data port.

4. The system of claim 1 wherein the first and second NAS devices each have a network interface and wherein a secondary exchange of the backup digital content involves coupling the first and second NAS devices to each other via the network interfaces.

5. The system of claim 1 wherein encryption keys are exchanged between the first and second NAS devices before the backup digital content is exchanged.

6. The system of claim 5 wherein the encryption keys are used to encrypt the backup digital content exchanged between the first and second NAS devices.

7. The system of claim 1 wherein the backup digital content of the first NAS device being stored by the second NAS device is selectively accessible to a second user associated with the second storage device.

8. A method, comprising:
    selectively starting, by a Network Attached Storage (NAS) device, a symbiotic relationship with another NAS device;
    exchanging, by the NAS device, backup digital content with the other NAS device in response to starting the symbiotic relationship, wherein said exchanging occurs via a communication network to which each NAS device is attached and to which devices that provide the backup digital content to each NAS device are attached;
    implementing a first data transfer process for primary transfers of the backup digital content between the NAS device and the other NAS device and implementing a second data transfer process for secondary transfers of the backup digital content between the NAS device and the other NAS device, a customizable threshold value used to determine use of primary transfers or secondary transfers;

selectively ending, by the NAS device, the symbiotic relationship;

and deleting, by the NAS device, the backup digital content received from the other NAS device in response to ending the symbiotic relationship.

9. The method of claim 8 wherein the first data transfer process comprises transferring data between the NAS device and the other NAS device via a local connection.

10. The method of claim 8 wherein the second data transfer process comprises transferring data between the NAS device and the other NAS device via a network connection.

11. The method of claim 8 further comprising exchanging encryption keys between the NAS device and the other NAS device before backup digital content is exchanged.

12. The method of claim 11 further comprising encrypting backup digital content exchanged between the NAS device and the other NAS device using the encryption keys.

13. The method of claim 8 further comprising automatically exchanging new digital content between the NAS device and the other NAS device based on the symbiotic relationship.

14. The method of claim 8, wherein the accelerated data transfer process comprises exchanging removable storage units between the NAS device and the other NAS device.

15. A Network Attached Storage (NAS)device, comprising:

a processor;

and a system memory that stores a symbiotic mirroring application;

wherein the symbiotic mirroring application, when executed by the processor, enables the NAS device to selectively start and to selectively end a symbiotic relationship with each of a plurality of other NAS devices coupled to a communication network, and wherein, for each symbiotic relationship, the NAS device exchanges backup digital content with another NAS device via the communication network for secondary transfers, wherein, for each symbiotic relationship, the backup digital content received by the NAS device from the another NAS device is protected by an ownership authentication scheme; and wherein the system further comprises a plurality of removable storage units, wherein a primary exchange of the backup digital content involves exchanging the removable storage units between the NAS device and the another NAS device.

16. The NAS device of claim 15 further comprising an input/output (I/O) interface, wherein the symbiotic mirroring application causes the primary exchange of the backup digital content to occur via the I/O interface.

17. The NAS device of claim 15 further comprising a network interface, wherein the symbiotic mirroring application causes the secondary exchange of the backup digital content to occur via the network interface.

* * * * *

UNITED STATES PATENT AND TRADEMARK OFFICE
CERTIFICATE OF CORRECTION

PATENT NO.        : 8,402,284 B2                                           Page 1 of 1
APPLICATION NO.   : 11/742564
DATED             : March 19, 2013
INVENTOR(S)       : Fred C. Thomas et al.

It is certified that error appears in the above-identified patent and that said Letters Patent is hereby corrected as shown below:

In the Claims

Column 9, line 28, in Claim 15, delete "(NAS)device," and insert -- (NAS) device, --, therefor.

Signed and Sealed this
Third Day of December, 2013

Margaret A. Focarino
*Commissioner for Patents of the United States Patent and Trademark Office*